US012579283B2

(12) United States Patent
Zheng

(10) Patent No.: US 12,579,283 B2
(45) Date of Patent: Mar. 17, 2026

(54) FACILITATING SECURITY VERIFICATION OF SYSTEM DESIGNS USING ADVERSARIAL MACHINE LEARNING

(71) Applicant: University of South Florida, Tampa, FL (US)

(72) Inventor: Hao Zheng, Tampa, FL (US)

(73) Assignee: University of South Florida, Tampa, FL (US)

( * ) Notice: Subject to any disclaimer, the term of this patent is extended or adjusted under 35 U.S.C. 154(b) by 35 days.

(21) Appl. No.: 18/750,135

(22) Filed: Jun. 21, 2024

(65) Prior Publication Data

US 2024/0427903 A1 Dec. 26, 2024

Related U.S. Application Data

(60) Provisional application No. 63/509,816, filed on Jun. 23, 2023.

(51) Int. Cl.
G06F 21/57 (2013.01)

(52) U.S. Cl.
CPC .................................. G06F 21/577 (2013.01)

(58) Field of Classification Search
CPC .................................................... G06F 21/577
See application file for complete search history.

(56) References Cited

U.S. PATENT DOCUMENTS

| | | | | |
|---|---|---|---|---|
| 2019/0042745 | A1* | 2/2019 | Chen | G06F 21/552 |
| 2019/0370477 | A1* | 12/2019 | Agarwal | G06F 21/577 |
| 2022/0180003 | A1* | 6/2022 | Tehranipoor | G06F 30/337 |
| 2022/0201042 | A1* | 6/2022 | Crabtree | G06F 16/2477 |
| 2022/0335135 | A1* | 10/2022 | McGraw | G06F 11/3688 |
| 2023/0274003 | A1* | 8/2023 | Liu | G06N 3/094 726/26 |
| 2023/0421596 | A1* | 12/2023 | Mishra | H04L 63/145 |
| 2024/0338491 | A1* | 10/2024 | Al Faruque | G06F 21/56 |

OTHER PUBLICATIONS

Pan, Zhixin, and Prabhat Mishra. "A Survey on Hardware Vulnerability Analysis Using Machine Learning." IEEE access (2022): 1-1. Web. (Year: 2022).*

* cited by examiner

*Primary Examiner* — Jung W Kim
*Assistant Examiner* — James P Moles
(74) *Attorney, Agent, or Firm* — Meunier Carlin & Curfman LLC

(57) ABSTRACT

In some aspects, the techniques described herein relate to a method and apparatus for testing a system including: obtaining a design of a system to be tested by a computing device; generating a plurality of traces based on the design of the system by the computing device; training a model of the system using the generated traces by the computing device; generating a plurality of attack traces for the model of the system by the computing device; attacking the model of the system using the generated plurality of attack traces by the computing device; validating some of the plurality of attack traces by the computing device; for each attack trace that is validated, determining possible system vulnerability based on the validated attack trace by the computing device.

20 Claims, 5 Drawing Sheets

100

Propose an attack trace

Adversarial Attacker 301

Trained AI-Model 303

Whether the proposed attack trace is feasible; provide hints if the attack is infeasible

300

Obtain design at different levels of abstraction          401

Obtain traces by simulating the design or execute silicon implementation          403

Process the traces          405

Apply traces to train AI-model          407

Apply adversarial machine learning to attack the AI-model          409

Validate the attack trace on the design that generates the traces          411

413

Attack trace valid?

No

Yes

Exit

400

506

504

System Memory

Volatile

Non-Volatile

Processing
Unit 502

Removable Storage
508

Non-Removable
Storage 510

Output Device(s)
516

Input Device(s) 514

Communication
Connection(s) 512

500

1

FACILITATING SECURITY VERIFICATION OF SYSTEM DESIGNS USING ADVERSARIAL MACHINE LEARNING

CROSS-REFERENCE TO RELATED APPLICATIONS

This application claims priority to, and benefit of, U.S. Provisional Patent Application No. 63/509,816, filed on Jun. 23, 2023, and titled "FACILITATING SECURITY VERIFICATION OF SYSTEM DESIGNS USING ADVERSARIAL MACHINE LEARNING." The contents of which is hereby incorporated by reference in its entirety.

BACKGROUND

System-on-chip (SoC) designs are a computing architecture that can be found in broad applications including internet-of-things, mobile devices, cloud computing, etc. SoC designs integrate pre-designed hardware/software blocks (referred to as "Intellectual Properties" or "IPs") that coordinate through a variety of on-chip communication fabrics to realize system functionalities. Unfortunately, SoC designs may include a variety of security vulnerabilities arising from untrustworthy IPs, errors and misconfigurations among IP and communication interfaces, etc. It is crucial to develop novel verification techniques to ensure the absence of such vulnerabilities in a SoC design before its deployment.

SUMMARY

This invention focuses on the vulnerabilities involving coordination and interactions of multiple IPs, which have traditionally been very difficult to identify and exercise during security verification. It develops an automated method that includes elements of constructing machine learning models capturing cross-IP communication characteristics observed during simulation, emulation, or post-silicon execution, and an adversarial machine learning technique to generate novel system communication behavior against the constructed machine learning models that can potentially reveal system vulnerabilities.

In some aspects, the techniques described herein relate to a method for testing a system including: obtaining a design of a system to be tested by a computing device; generating a plurality of traces based on the design of the system by the computing device; training a model of the system using the generated traces by the computing device; generating a plurality of attack traces for the model of the system by the computing device; attacking the model of the system using the generated plurality of attack traces by the computing device; validating some of the plurality of attack traces by the computing device; for each attack trace that is validated, determining possible system vulnerability based on the validated attack trace by the computing device.

In some aspects, the techniques described herein relate to a method, further including for each attack that is not validated, updating the model of the system using the attack trace.

In some aspects, the techniques described herein relate to a method, wherein attacking the model of the system includes attacking the model of the system using adversarial machine learning.

In some aspects, the techniques described herein relate to a method, further including processing the generated plurality of traces into a format.

In some aspects, the techniques described herein relate to a method, wherein generating the plurality of traces includes simulating the system.

In some aspects, the techniques described herein relate to a method, wherein the system includes an SoC.

In some aspects, the techniques described herein relate to a method, wherein the SoC includes a plurality of IPs.

In some aspects, the techniques described herein relate to an apparatus for testing a system including: at least one computing device; and a computer-readable medium including computer-executable instructions that when executed by the at least one computing device cause the at least one computing device to: obtain a design of a system to be tested; generate a plurality of traces based on the design of the system; train a model of the system using the generated traces; generate a plurality of attack traces for the model of the system; attack the model of the system using the generated plurality of attack traces; validate some of the plurality of attack traces; for each attack trace that is validated, determine possible system vulnerability based on the validated attack trace.

In some aspects, the techniques described herein relate to an apparatus, further including for each attack that is not validated, updating the model of the system using the attack trace.

In some aspects, the techniques described herein relate to an apparatus, wherein attacking the model of the system includes attacking the model of the system using adversarial machine learning.

In some aspects, the techniques described herein relate to an apparatus, further including processing the generated plurality of traces into a format.

In some aspects, the techniques described herein relate to an apparatus, wherein generating the plurality of traces includes simulating the system.

In some aspects, the techniques described herein relate to an apparatus, wherein the system includes an SoC.

In some aspects, the techniques described herein relate to an apparatus, wherein the SoC includes a plurality of IPs.

In some aspects, the techniques described herein relate to a non-transitory computer-readable medium including computer-executable instructions that when executed by at least one computing device cause at least one computing device to: obtain a design of a system to be tested; generate a plurality of traces based on the design of the system; train a model of the system using the generated traces; generate a plurality of attack traces for the model of the system; attack the model of the system using the generated plurality of attack traces; validate some of the plurality of attack traces; for each attack trace that is validated, determine possible system vulnerability based on the validated attack trace.

In some aspects, the techniques described herein relate to an apparatus, further including for each attack that is not validated, updating the model of the system using the attack trace.

In some aspects, the techniques described herein relate to an apparatus, wherein attacking the model of the system includes attacking the model of the system using adversarial machine learning.

In some aspects, the techniques described herein relate to an apparatus, further including processing the generated plurality of traces into a format.

In some aspects, the techniques described herein relate to an apparatus, wherein generating the plurality of traces includes simulating the system.

In some aspects, the techniques described herein relate to an apparatus, wherein the system includes an SoC.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
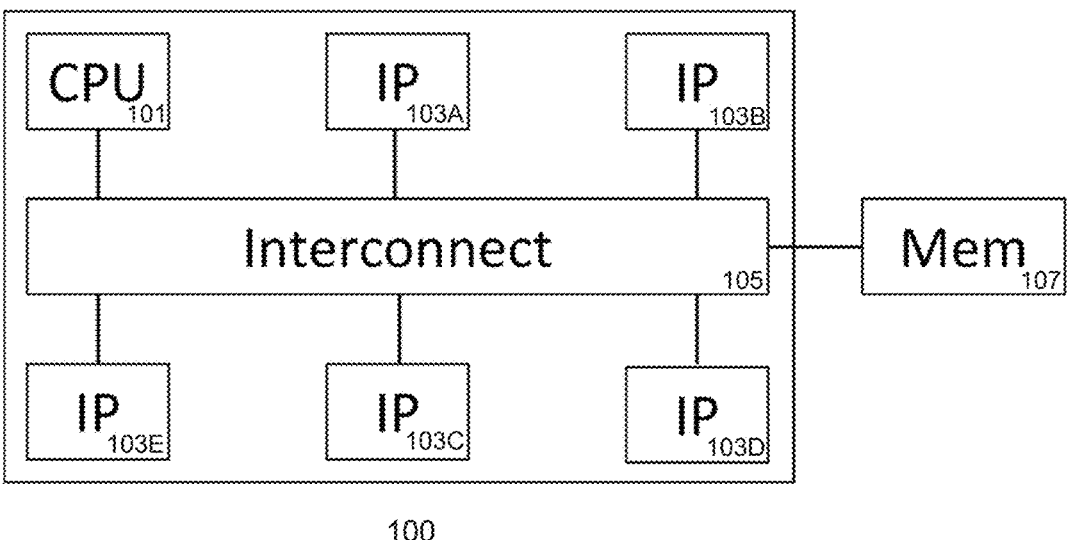
FIG. 1 is an illustration of an example SoC.

FIG. 1 is an illustration of an example system 100. In the example shown, the system 100 is a system-on-a-chip ("SoC") that will be tested. Other types of systems 100 may be tested. As shown, the SoC includes one or more processors ("CPUs") 101, a memory 107, and a plurality of components that are known as intellectual properties ("IP") 103 or cores (i.e., the IPs 103A-103E). Each IP 103 may be connected to each other, the memory 107, and the CPU 101 through an interconnect 105. Each IP 103 may perform one or more functions or services for the SoC 100 and may include Ethernet controllers, power modules, processor units, Wi-Fi or Bluetooth controllers, USB controllers, and sound or graphics controllers.

Each IP 103 may be sourced from an untrusted third-party provider, may contain design errors, may function as a black box, and therefore may introduce intentional or unintentional security vulnerabilities into the SoC 100. Note that while the system 100 is described as an SoC, it is not limited to such embodiments. The system 100 may include any system that includes one or more components working together.

Figure 2:
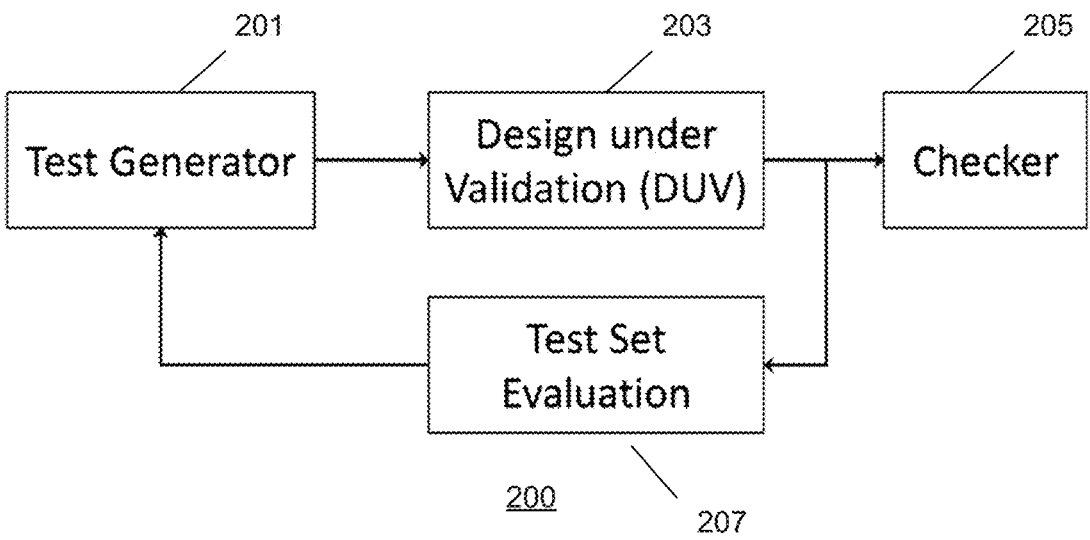
FIG. 2 is an illustration of an example method for evaluating systems such as an SoC.

Continuing to FIG. 2 is an illustration of a common process for testing systems 100. The process 200 may be performed by one or more computing devices such as the computing device 500 of FIG. 5. As may be appreciated, many vulnerabilities (intentional and unintentional) may be introduced into the system 100 due to the various IPs 103 or other components. As a result, a system 100 (referred to as the design under validation "DUV") may be tested before it is released or put into production. Generally, the testing includes four stages. At the stage 201, a plurality of tests is generated for the DUV. These tests are meant to test the operation of the DUV under variety of input combinations and operating scenarios. These tests are typically generated by one or more human testers, programs implementing test generation algorithms, or automated testing equipment. Depending on the embodiment, each text may include generating a plurality of inputs to test the DUV.

At stage 203, once the tests are generated the tests are ran on the DUV to generate a set of outputs. Similarly, as above, the tests may be ran on the DUV by one or more human testers via simulators, emulators, or testing equipment.

At stage 205, the outputs of the tests are evaluated by one or more human checkers, programs implementing output checking algorithms, or testing equipment, that determine if the generated outputs are what were expected for each test. An unexpected result may indicate a vulnerability which may warrant further testing for confirmation.

At stage 207, the outputs and the generated tests are evaluated to determine whether the inputs associated with the generated tests were sufficient to determine if the DUV has any vulnerabilities. If not, additional tests may be created at stage 201 and the process may continue. The evaluators may be different humans, programs, or testing equipment than those that initially generated the tests at 201.

As may be appreciated, the process described in the method 200 to test systems 100 for vulnerabilities is an expensive and time-consuming task. Design of effective tests or test generation algorithms requires extensive human creativities and expertise in order to high quality tests that can efficiently reveal potential vulnerabilities in the target system. Many human testers are needed to both generate the tests and to run the tests on the system 100. Moreover, because humans are involved, the testing process is necessarily vulnerable to human errors and oversight which may result in undetected vulnerabilities.

Figure 3:
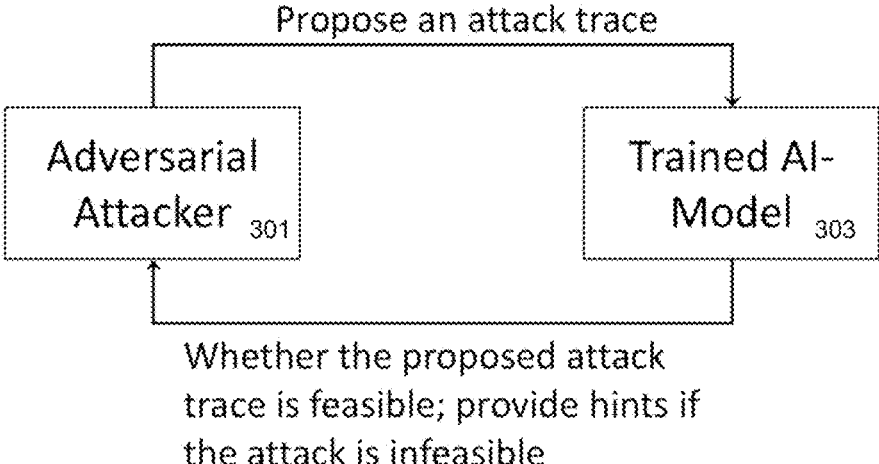
FIG. 3 is an illustration of an example method for generating attack traces using adversarial machine learning.
Figure 4:
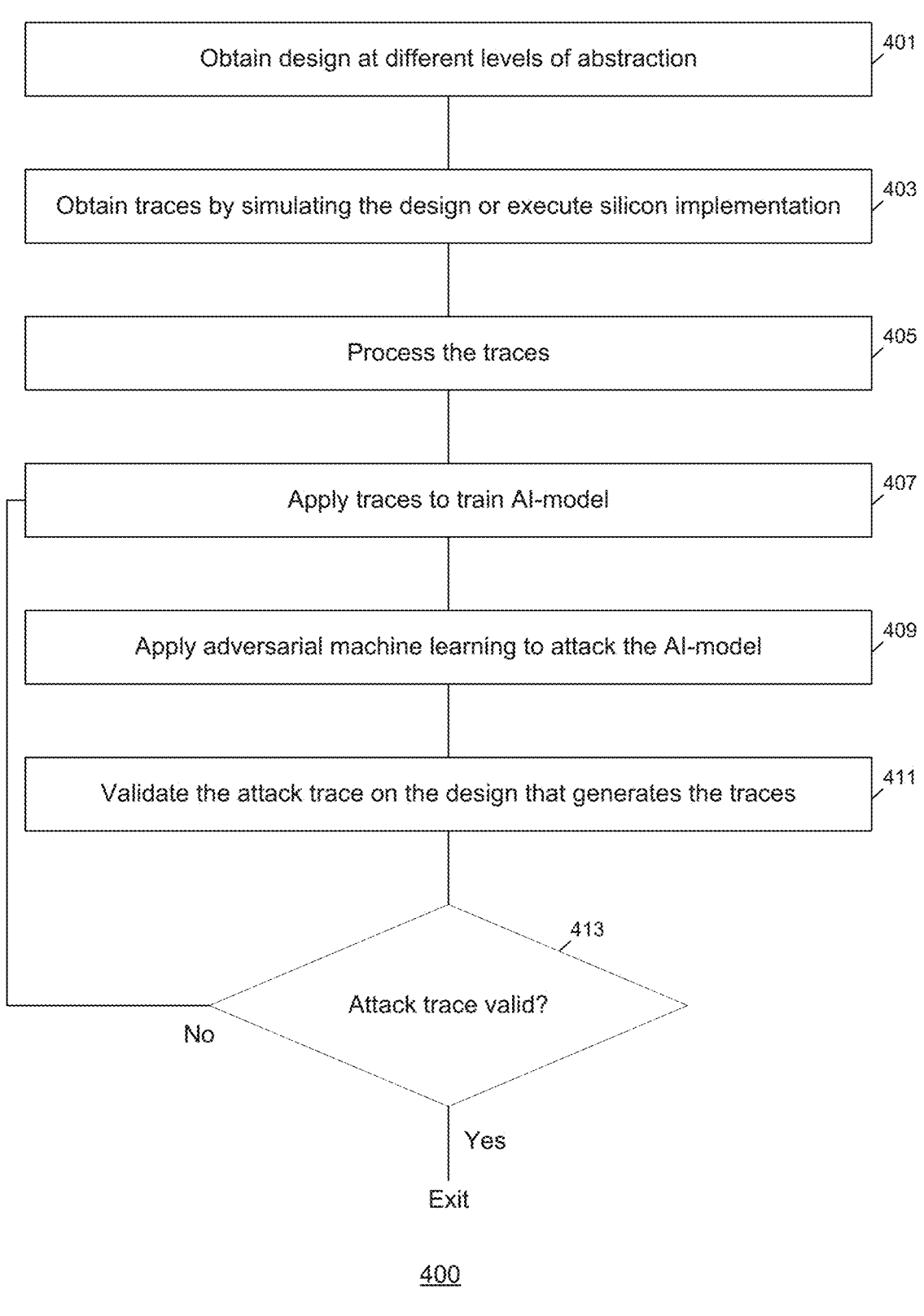
FIG. 4 is an illustration of an example method for validating a system using adversarial machine learning.

Accordingly, to solve the problems noted above with respect to conventional methods for system validation, as shown in the methods 300 and 400 of FIGS. 3 and 4, adversarial machine learning may be used to assist and facilitate testing and validation of a system 100. Initially, at 303 a trained AI model is provided that is trained using actual traces generated using the system 100 or based on design documents associated with the system 100. The model is trained to receive a proposed trace and to output the probability or likelihood that the proposed trace is feasible in the system 100. A trace is feasible if it is possible to be observed during the operation of the system 100, and infeasible if it is not possible or unlikely to observed during the operation of the system 100.

The trained AI model can be a LSTM, a transformer model or one of its variants. The model can be trained using the technique called next sequence prediction, that is, an arbitrary sub-sequence s of the trace and the following event e in the same trace are used to train the model such that the model can correctly predict the following event for an input given sequence.

In addition, if the proposed attack trace is not feasible, the model is able to provide hints such as gradients on the output loss functions of the model 303 or possible changes to the proposed attack trace to the attacker model 301 so that it can be further trained and would be able to generate a successful attack trace eventually if a security vulnerability of the target design is indeed represented in the model 303. An attack trace is a trace such that a security vulnerability would occur if the system 100 behaves according to such trace.

In some embodiments, If the model 303 thinks the attack trace proposed by model 301 is not feasible, it can output information including gradients on the output loss function used by the model 303. Such information can then be used to train model 301 to propose new attack traces.

As part of the adversarial machine learning process, at 301, an adversarial attacker may generate and propose one or more attack traces to the trained AI-model. The adversarial attacker may be an AI model that is trained to generate attack traces. The adversarial attacker model 301 may be similar to the model 303. This model can be trained as described above. Additionally, the model 301 can be initially trained with attack traces for previously discovered vulnerabilities, and then further trained as described above.

After generating an attack trace the adversarial attacker provides the attack trace to the trained AI model 303 of the system 100 at 303. The model 303 may receive the attack trace and may make a determination of whether or not the attack trace is feasible or infeasible. Depending on the embodiment, the attack trace is feasible if the model 303, trained on actual traces from the system 100, finds that the attack trace is feasible with a sufficiently high probability. Otherwise, the attack trace is considered infeasible.

As will be described further below with respect to FIG. 4, attack traces that are found to be feasible are saved and later validated using the system 100. Attack traces that are not found to be feasible may be discarded. The attack traces, whether found to be feasible or infeasible may be provided as feedback to the adversarial attacker and may be used to improve or retrain the model used by the adversarial attacker to generate attack traces. This creates a feedback loop where the adversarial attacker is able to generate attack traces that are continuously improved upon.

In some embodiments, when the trained AI model 303 determines that a proposed attack trace is infeasible, the AI model may provide hints such as the gradients of the output loss functions of the AI model or changes that may be made by the adversarial attacker to the attack trace to make it feasible. The adversarial attacker may then incorporate the hints or changes into subsequent steps of attack trace generation so that the attack traces generated in the future would have higher probabilities to be viewed as feasible by the AI model 303.

For example, given an attack trace generated by attacker model 301, $t=(e_0, e_1, \ldots, e_n)$, where $e_i$, $i \in \{0, n\}$ are captured system events, it can be validated by model 303 for feasibility using the next sequence prediction technique. Specifically, for each prefix of t, $t_h=(e_0, e_1, \ldots, e_h)$, if model 303 determines that the next event following $t_h$ is not $e_{h+1}$ in t, it may suggest another event $e_{h+1}'$ following $t_h$. This information is fed back to attacker model 301 in the form of $t_h$ & $e_{h+1}'$ referring to concatenating $e_{h+1}'$ to the end of $t_h$, and attacker model 301 will try to generate another attack trace with the prefix $t_h$ & $e_{h+1}'$, which is then validated by model 303.

FIG. 4 is an illustration of an example method 400 for testing a system 100. The method 400 may be implemented by the computing system 400 of FIG. 4.

At 401, a design of a system 100 is obtained. The design of the system 100 may be obtained at various levels of abstraction. For example, the design of the system 100 may be a schematic or may be a working prototype of the system 100. In one embodiment, the system 100 may be a SoC made up of a plurality of IPs 103. Other types of systems 100 may be supported and tested.

At 403, a plurality of traces is obtained by simulating the design of the system 100 or by executing the silicon implementation of such system. A trace may be captured data that illustrates how the various components (e.g., IPs 103) of the system 100 are operating and communicating with each other while performing certain functions or processes. The particular functions and inputs used for each trace may be selected by a user or administrator. Any method for simulating a system 100 and capturing a trace may be used.

At 405, the traces are processed. Each trace may be processed such that the trace is in a format that can be used to train the AI model 303 of the system. The particular format may be selected by a user or administrator.

At 407, the processed traces are applied to train a model. The model may be an AI model of the system 100. The model may be trained using machine learning. Suitable models include neural networks (e.g., convolutional neural networks, feed forward neural networks, and recurrent neural networks). Other types of AI models may be supported. The model may be adapted to receive a trace and output a probability that the trace is feasible in the system 100. In addition, the model may provide clues or suggestions for changes to a received trace to make it feasible in the system 100.

At 409, adversarial machine learning is used to attack the model. In some embodiments, an adversarial machine learning model may generate a plurality of attack traces for the model of the system 100. Each attack trace may represent a possible vulnerability for the system 100. In some embodiments, each generated attack trace may be confirmed by the model of the system 100 as being feasible in the system 100. Each attack trace may be generated in the feedback loop as described with respect to FIG. 3.

At 411, each attack trace is validated or invalidated using the obtained design (e.g., the design obtained at 401). At 413, If an attack trace is successfully validated then the validated attack trace is provided as evidence of a possible vulnerability. If the attack trace is not validated, indicating that the model was incorrect, the invalid trace is used as negative feedback for the model during training at 407.

Figure 5:
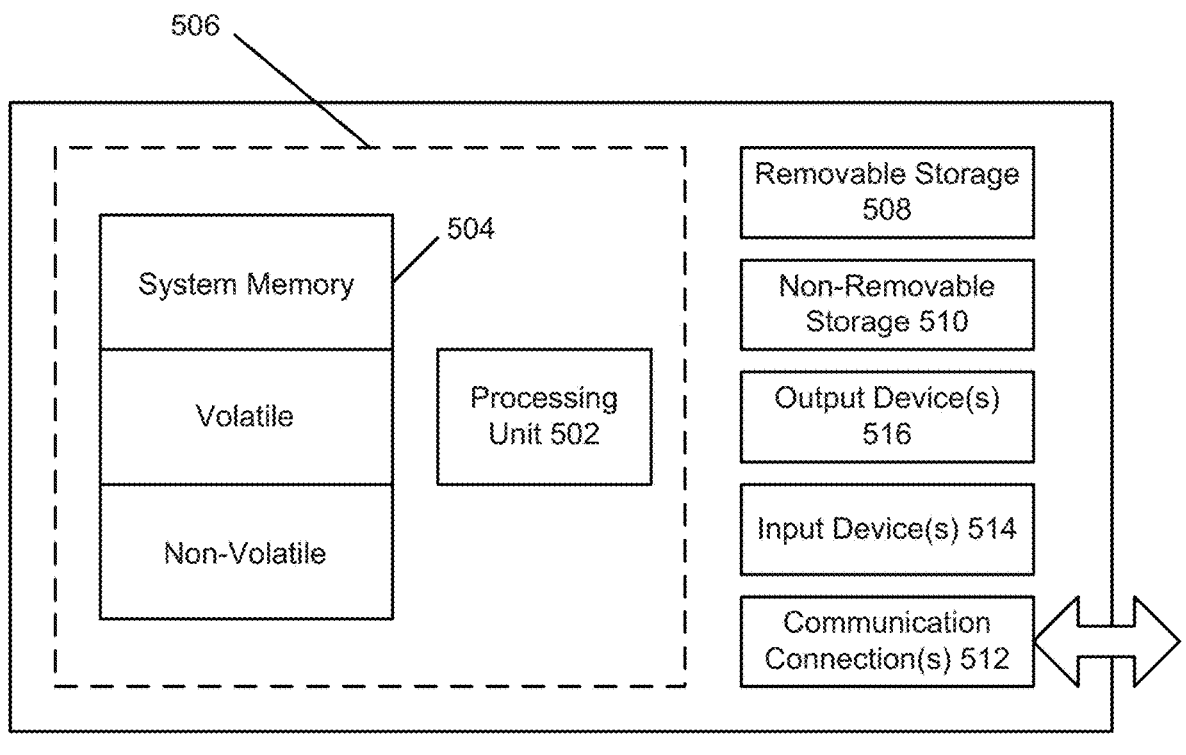
FIG. 5 illustrates an example computing device.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for testing a system comprising:
obtaining a design of a system to be tested by a computing device;
generating a plurality of traces based on the design of the system by the computing device;
training a model of the system using the generated traces by the computing device;
receiving a first plurality of attack traces by the computing device, wherein each attack trace of the plurality of attack traces is associated with a previously discovered vulnerability;
training an adversarial attacker model using the first plurality of attack traces by the computing device;
generating a second plurality of attack traces for the model of the system by the computing device using the adversarial attacker model;
attacking the model of the system using the generated second plurality of attack traces by the computing device;
validating some of the second plurality of attack traces by the computing device; and
for each attack trace of the second plurality of attack traces that is validated, determining possible system vulnerability based on the validated attack trace by the computing device.

2. The method of claim 1, further comprising for each attack that is not validated, updating the model of the system using the attack trace.

3. The method of claim 1, wherein attacking the model of the system comprises attacking the model of the system using adversarial machine learning.

4. The method of claim 1, further comprising processing the generated plurality of traces into a format.

5. The method of claim 1, wherein generating the plurality of traces comprises simulating the system.

6. The method of claim 1, wherein the system comprises an SoC.

7. The method of claim 6, wherein the SoC comprises a plurality of IPs.

8. An apparatus for testing a system comprising:
at least one computing device; and
a computer-readable medium comprising computer-executable instructions that when executed by the at least one computing device cause the at least one computing device to:
obtain a design of a system to be tested;
generate a plurality of traces based on the design of the system;
train a model of the system using the generated traces;
receive a first plurality of attack traces, wherein each attack trace of the plurality of attack traces is associated with a previously discovered vulnerability;
train an adversarial attacker model using the first plurality of attack traces;
generate a second plurality of attack traces for the model of the system;
attack the model of the system using the generated plurality of attack traces;
validate some of the second plurality of attack traces;
for each attack trace of the second plurality of attack traces that is validated, determine possible system vulnerability based on the validated attack trace.

9. The apparatus of claim 8, further comprising computer-executable instructions that when executed by the at least one computing device cause the at least one computing device to: for each attack that is not validated, update the model of the system using the attack trace.

10. The apparatus of claim 8, further comprising computer-executable instructions that when executed by the at least one computing device cause the at least one computing device to: attack the model of the system using adversarial machine learning.

11. The apparatus of claim 8, further comprising computer-executable instructions that when executed by the at least one computing device cause the at least one computing device to: process the generated plurality of traces into a format.

12. The apparatus of claim 8, further comprising computer-executable instructions that when executed by the at least one computing device cause the at least one computing device to: simulate the system.

13. The apparatus of claim 8, wherein the system comprises an SoC.

14. The apparatus of claim 13, wherein the SoC comprises a plurality of IPs.

15. A non-transitory computer-readable medium comprising computer-executable instructions that when executed by at least one computing device cause at least one computing device to:
obtain a design of a system to be tested;
generate a plurality of traces based on the design of the system;
train a model of the system using the generated traces;
receive a first plurality of attack traces, wherein each attack trace of the plurality of attack traces is associated with a previously discovered vulnerability;
train an adversarial attacker model using the first plurality of attack traces;

generate a second plurality of attack traces for the model of the system;

attack the model of the system using the generated plurality of attack traces;

validate some of the second plurality of attack traces;

for each attack trace of the second plurality of attack traces that is validated, determine possible system vulnerability based on the validated attack trace.

16. The computer-readable medium of claim 15, further comprising computer-executable instructions that when executed by the at least one computing device cause the at least one computing device to: for each attack that is not validated, update the model of the system using the attack trace.

17. The computer-readable medium of claim 15, further comprising computer-executable instructions that when executed by the at least one computing device cause the at least one computing device to: attack the model of the system using adversarial machine learning.

18. The computer-readable medium of claim 15, further comprising computer-executable instructions that when executed by the at least one computing device cause the at least one computing device to: process the generated plurality of traces into a format.

19. The computer-readable medium of claim 15, further comprising computer-executable instructions that when executed by the at least one computing device cause the at least one computing device to: simulate the system.

20. The computer-readable medium of claim 15, wherein the system comprises an SoC.

* * * * *